United States Patent [19]

Yomamoto et al.

[11] 4,258,153

[45] Mar. 24, 1981

[54] FLAME RETARDING POLYESTER COMPOSITION

[75] Inventors: Yoshiyuki Yomamoto, Suzuka; Akira Yoshioka, Nagoya; Masanobu Morikawa, Tokyo, all of Japan

[73] Assignee: Toray Industries, Inc., Tokyo, Japan

[21] Appl. No.: 19,252

[22] Filed: Mar. 9, 1979

[30] Foreign Application Priority Data

Mar. 22, 1978 [JP] Japan .................................. 53-31637

[51] Int. Cl.³ .............................................. C08G 65/48
[52] U.S. Cl. ............................. 525/397; 260/45.7 PH; 260/45.75 R; 260/45.75 D; 260/45.75 B; 260/45.8 R; 260/45.95 G; 525/437
[58] Field of Search ............... 525/397, 437; 260/45.95 G, 45.7 PH, 45.8 R, 45.75 R, 45.75 D, 45.75 B

[56] References Cited

U.S. PATENT DOCUMENTS

| | | | |
|---|---|---|---|
| 3,855,277 | 12/1974 | Fox ................................ | 260/45.75 B |
| 3,884,990 | 5/1975 | Sakata et al. ..................... | 525/437 |
| 3,932,351 | 1/1976 | King ................................ | 525/437 |
| 3,940,367 | 2/1976 | Pelousek et al. ............... | 260/45.7 PH |
| 3,959,213 | 5/1976 | Gilkey et al. ................... | 260/45.7 PH |
| 4,088,709 | 5/1978 | Seymour et al. ............... | 260/45.7 PH |

*Primary Examiner*—Melvyn I. Marquis
*Attorney, Agent, or Firm*—Miller & Prestia

[57] ABSTRACT

Disclosed is a flame retarding polyester composition comprising a thermoplastic polyester, a polymeric halogen containing a flame retarding agent, and a selected phosphite compound.

5 Claims, No Drawings

FLAME RETARDING POLYESTER COMPOSITION

This invention relates to a flame-retardant thermoplastic polyester resin composition which has excellent external appearance, physical properties and results in a particularly good dispersion of the flame-retardant in a composition.

Thermoplastic polyesters such as poly(ethylene terephthalate), poly(butylene terephthalate), poly(ethylene naphthalate) and poly(cyclohexane dimethylene terephthalate) have recently been utilized for many commercial applications such as mechanical parts, electrical and electronical parts, and automobile materials.

Those polyesters have well-balanced properties in respect to hygroscopic, molding, physical and thermal properties, but they also exhibit a flammability problem.

It has been described in U.S. Pat. No. 3,855,277 that the flammability of polyesters can be retarded by blending them with a halogenated polycarbonate prepared from tetrabromobisphenol A.

Such a polyester composition containing the above mentioned polymeric flame retarding agent does not "plate out" or "bloom upon" molding of the same or upon maintenance of the molded article at an elevated temperature for a long time. The thermal stability of the composition is also excellent.

The above polymeric flame retarding agents, however, do not exhibit good fluidity and solubility with polyesters. Accordingly these flame retarding agents are non-uniformly dispersed in the polyester and tend to deteriorate the originally excellent physical properties and appearance of a molded article prepared from the polyester composition. Thus, the object of the present invention is to provide a flame retarding thermoplastic polyester composition which contains a nonblooming flame-retarding agent that maintains the excellent mechanical properties and appearance of molded articles prepared therefrom.

We now have found that the specific phosphite compounds defined hereinafter remarkably improve the solubility of the halogenated polymeric flame-retarding agents in polyesters, and thereby enhance the mechanical properties and appearance of the flame-retarding polyester composition.

According to this invention there are provided flame retarding thermoplastic polyester compositions comprising:

(A) a thermoplastic polyester comprising condensation products of an aromatic dicarboxylic acid component and an alkanediol component, (B) from 3 to 30 parts by weight per 100 parts of the thermoplastic polyester (A) of a polymeric flame retarding agent having, in the recurring unit, a structure represented by following formula,

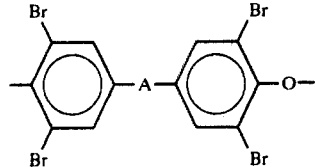

wherein A represents an alkylene group having 1 to 6 carbon atoms, ether, carbonyl, thioether or a sulfone group, said polymeric flame retarding agent have a molecular weight of from about 1000 to 5000, and (C) from 1 to 15 parts by weight per 100 parts of the polyester of at least one phosphite compound selected from the group consisting of the compounds represented by the general formula (I) and (II),

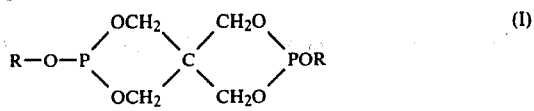

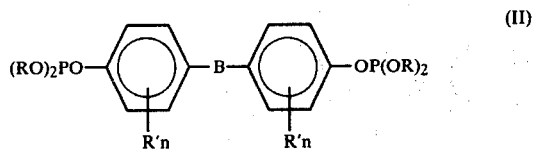

wherein R represents an alkyl group having 6 to 20 carbon atoms, R' represents hydrogen or an alkyl group having 1 to 6 carbon atoms, n is an integer of 2 to 4 and B represents an alkylene group having 1 to 6 carbon atoms, ether, carbonyl, thioether or sulfone group.

The thermoplastic polyester, a component of the composition of this invention, is a condensation product of an aromatic dibasic acid component and an alkanediol component. The dibasic acid component may be derived from terephthalic acid, 2,6-naphthalene dicarboxlic acid and isophthalic acid etc, and the alkanediol component may be derived from ethylene glycol, propylene glycol, butylene glycol and hexylene glycol, etc.

Thus, the polyesters of this invention are poly(ethylene terephthalate) (PET), poly(propylene terephthalate) (PPT), poly(butylene terephthalate) (PBT), poly(hexylene terephthalate) (PHT), poly(ethylene naphthalate) (PEN), poly(butylene naphthalate) (PBN) etc. Suitable polyesters may comprise copolymers such as, for example, poly(ethylene terephthalate-isophthalate) (PETI), poly(butylene terephthalate-isophthalate) (PBTI), etc.

These polyesters may also comprise up to 30 mol % of one or more comonomers such as sulfophthalic acid, adipic acid, sebacic acid etc.

The polymeric flame-retarding agent used in this invention may be a compound having, in the recurring unit, a structure represented by the formula

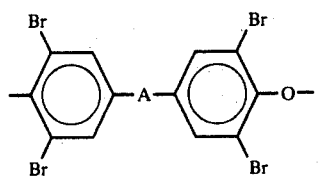

wherein A represents an alkylene group having 1 to 4 carbon atoms, ether, carbonyl, thioether and sulfone groups. Said compounds may be prepared by polycondensation from a tetrabromo dihydric phenol (III) as represented by following general formula and other monomers polycondensable therewith.

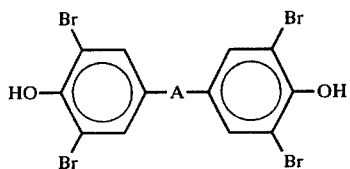

Those polymeric compounds may have following recurring units:

(1) polycarbonate

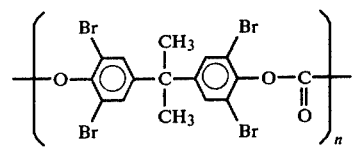

(2) polyphosphonate

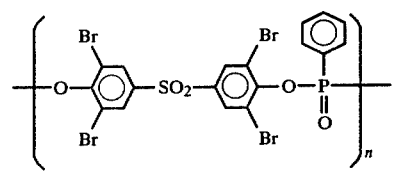

(3) polyester

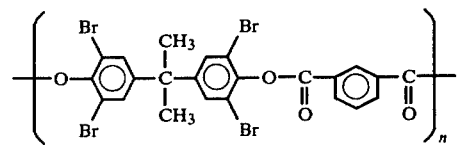

(4) epoxy-resin type polymer

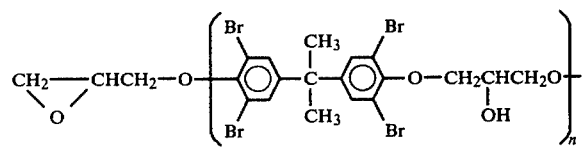

These compounds can be prepared by a conventional polycondensation reaction from tetrabromo dihydric phenol (III) and either phosgene, dichloro phenylphosphate, a dichloride of an aromatic dicarboxylic acid or epichlorohydrin.

The polymeric flame-retarding agent may be represented by the following general formula

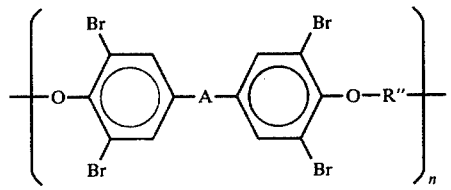

wherein R" is a divalent group selected from:

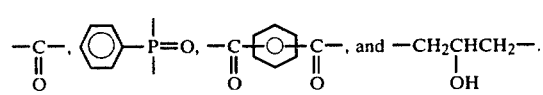

The polycarbonate and the epoxy-resin type polymer are preferred and commercially available. The former is available from Mitsubishi Gas Chemical Co. Ltd. under the trade name of FR-50 and the latter from Hitachi Chemical Co. Ltd. under the trade name of BR-128F.

The polymerization degree of these polymeric compounds may be from 2 to 10, preferably from 2 to 7, that is, the molecular weight is about 1000 to 5000. Such a molecular weight generally gives a useful softening point and low blooming property. Among the recurring units as shown above, (1) and (4) are preferable because of their excellent thermal stability.

These compounds are incorporated in an amount of 3-30 parts by weight, preferably 5 to 25 parts by weight, per 100 parts of the polyester.

When an admixture of a metal-containing compound is made as a flame retarding assistant, it is possible to achieve a still greater increase in the flame retarding effects of the resulting resin. Useful metal-containing compounds comprise the oxides of such metals as, for example, antimony, tin, aluminium, zirconium, etc. Preferable compounds are antimony trioxide, tin oxide, aluminium oxide and zirconium dioxide. These compounds are incorporated in an amount of 1-15 parts by weight per 100 parts of the polyester.

Examples of phosphite compounds used in this invention as represented by the above general formula (I) and (II) can be illustrated as follows:

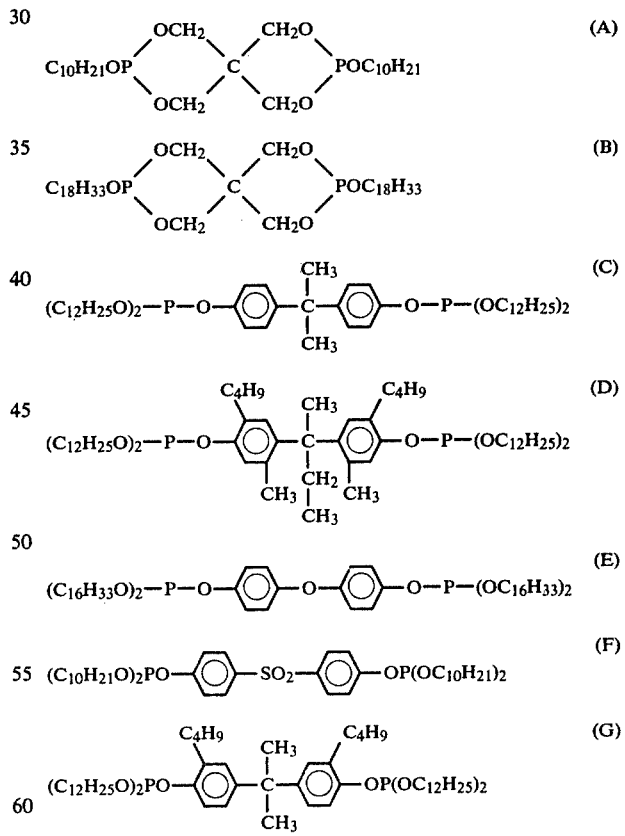

These compounds are commercially available under the trade name of:

---
A: HI-M-O (Sanko Chemical Co., Ltd.)
B: HI-M-P (Sanko Chemical Co., Ltd.)
  Mark PEP (Adeka Argus Chemical Co., Ltd.)

-continued

C: Mark 1500 (Adeka Argus Chemical Co., Ltd.)
D: Mark 260 (Adeka Argus Chemical Co., Ltd.)
Mark P (Adeka Argus Chemical Co., Ltd.)

Although these commercially available phosphites may contain some other components, they do not cause any problem in the composition of the present invention.

The phosphite compounds are incorporated in an amount of 0.1–10% by weight to the flame-retardant or 0.01–5 parts, preferably 0.05–0.5 parts, by weight, per 100 parts of the polyester.

The use of more than the above designated amount of the phosphite compound may cause difficulties in processing and deterioration of tensile strength.

The use of too small of an amount of the phosphite compounds may result in unsatisfactory effects in the final composition, that is, the composition may become yellowish, because of poor dispersion of the flame-retardant.

The composition of the present invention may further contain an epoxy compound, which increases the physical and the electrical properties and thermal stability as well as flow stability in a molten state, of the resulting composition.

The epoxy compounds most preferably used in this case, is a bisphenol A type epoxy resin.

The amount of the epoxy compound is 0.1–10 parts by weight to 100 parts of the polyester.

The composition of this invention can be stabilized by the addition of a thermal stabilizer.

Examples of acceptable stabilizers are: phosphorus compounds such as phosphoric acid, phosphorous acid, hypophosphorous acid derivatives, phenylphosphonic acid, phenylphosphinic acid, diphenylphosphonic acid, polyphosphonate, etc, a hindered phenol compound, various kinds of which are commercially available, and a sulfur-containing compound such as a thioether, a salt of a dithioic acid, mercaptobenzimidazole, and thiocarbanilide. The preferable stabilizer may be distearyl-3,3'-thiodipropionate, commercially available from Sumitomo Chemical Co., Ltd. under the trade name of Sumilizer TPS.

The flame-retardant thermoplastic polyester composition of this invention may further comprise reinforcing agents such as glass fibers, asbestos, calcium methasilicate, potassium titanate and ceramic fibers, etc. as well as fillers such as talc, clay, calcium oxide, aluminium oxide, etc. in an amount of 5–70 parts by weight per 100 parts of the polyester.

In order to improve the processability of this composition in the present invention, it is possible to further add a mold-release agent such as a salt of stearic acid (calcium, barium, aluminum, lithium salts, for example), silicone oil, montane wax (ester, half-ester, salt), an ester of stearic acid, ethylene bis-stearylamide, etc. in an amount of 0.05–5.0 parts by weight per 100 parts of the polyester.

Other additives such as dyes, pigments, plasticizers, UV stabilizers, blowing agents, thickeners, etc. may also be used.

The polyester composition of this invention may be prepared by conventional methods.

In accordance with one practical method, the phosphite compound may be added to the polyester together with the polymeric flame-retarding agent and other additives. After optionally mixing these components of the composition, the mixture may be fed to an extruder, and formed into pellets. Also the mixture may be directly fed into an injection molding process.

The additives may also be added into the polymerization vessel of the polyester.

The polyester composition of this invention may be molded into various articles by conventional injection, extrusion or compression molding techniques.

The molded articles prepared from the compositions of the present invention are excellent in flame-retardancy, physical, thermal, and are electrical properties, and useful as mechanical parts, electrical parts and automobile materials.

The present invention is further illustrated by the following examples.

All parts and percentages in the examples as well as in the specification and claims are by weight unless otherwise specified.

Relative viscosity is measured at 25° C. in a solution comprising 0.5% by weight of the polymer using orthochlorophenol as the solvent.

EXAMPLE 1

In a Henschel Mixer, 100 Parts of Poly(butylene terephthalate) having a relative viscosity of 1.60 are admixed with: 20 parts of polycarbonate prepared from tetrabrombisphenol A and phosgene (the trade name of FR-50, product of Mitsubishi Gas Chemical Co., Ltd), 0.3 parts of any of the following phosphite compounds ((A)-(D)and(H)-(J)), 6 parts of antimony trioxide, 0.5 parts of EPIKOTE 819 (product of Shell Company), 0.5 parts of IRGANOX 1035 (product of Ciba-Geigy) and 0.2 parts of Hoechst Wax OP (product of Hoechst). The phosphite compounds are:

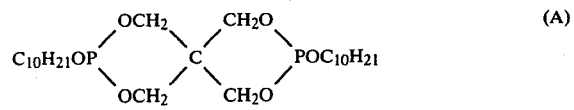

(A)

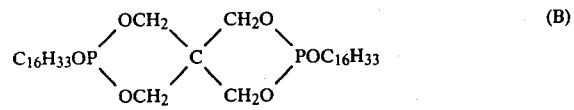

(B)

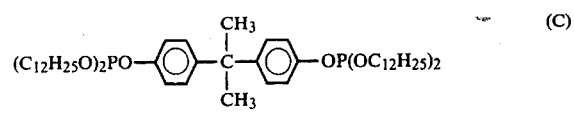

(C)

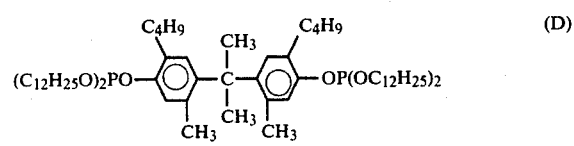

(D)

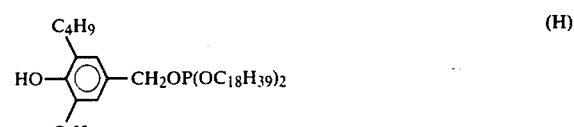

(H)

(I)

-continued

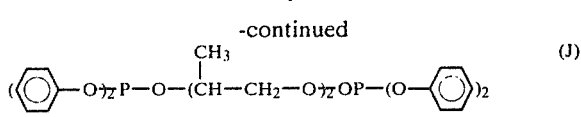
(J)

The thus obtained blends are compounded at 280° C. by passing them through a 30 mm single screw extruder. The extrudate is pelletized, and after drying the pellets are injection molded at 250° C. into ASTM type test bars and UL type flammability test bars. Using these test bars, tensile strength, impact resistance and flammability were measured by ASTM method D-638, ASTM D-256, and Underwriter's Laboratories subject 94, respectively.

The dispersion of FR-50 in poly(butylene terephthalate) is observed from electron microscope.

The results thus obtained are shown in Table 1.

The data in Table 1 demonstrate that in comparison with the compositions containing phosphite compound (H)-(J), the compositions containing phosphite compounds (A)-(E) have higher toughness, as shown by an increase in the elongation at break and are also improved in the dispersion of the flame-retarding agent and color of the molded article.

trade name of BR-128F, the product of Hitachi Chemical Co., Ltd.), 6 parts of antimony trioxide, 0.5 parts of EPIKOTE 819, 0.3 parts of Sumilizer TPS, and an amount shown in Table 2 of the following phosphite compounds, (B), (C) (K) and (L):

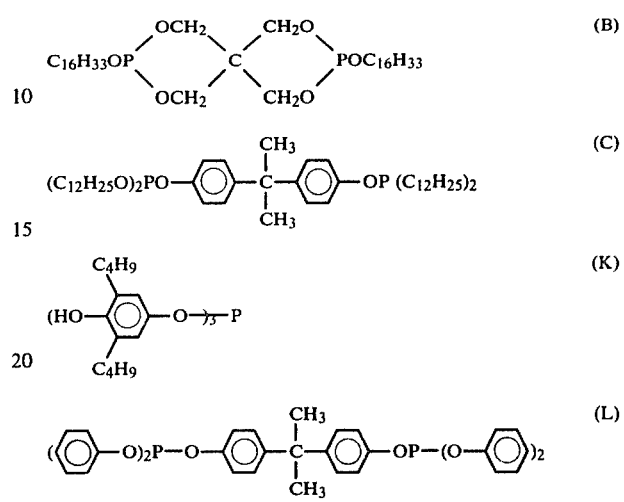

TABLE 1.

| Phosphite Compound | EXAMPLE | | | | CONTROL | | | |
|---|---|---|---|---|---|---|---|---|
| | (A) | (B) | (C) | (D) | (H) | (I) | (J) | — |
| Physical Properties | | | | | | | | |
| Tensile Strength (kg/cm²) | 590 | 590 | 585 | 590 | 601 | 586 | 590 | 580 |
| Elongation at Break (%) | 30 | 33 | 36 | 24 | 8 | 7 | 9 | 5 |
| Notched Izod Impact Strength (V-Notch, ¼", kg . cm/cm) | 3.0 | 3.1 | 3.1 | 2.9 | 2.4 | 2.2 | 2.3 | 2.0 |
| Flammability | | | | | | | | |
| 1/32" | V-0 | V-0 | V-0 | V-0 | V-0 | V-0 | V-0 | V-0 |
| ⅛" | V-0 | V-0 | V-0 | V-0 | V-0 | V-0 | V-0 | V-0 |
| Dispersion of flame-retardant | excellent | excellent | excellent | excellent | poor | poor | poor | poor |
| Color | white | white | white | white | yellow | brown | brown | brown |

EXAMPLE 2

In a Henschel Mixer, 100 parts of poly(butylene terephthalate) having a relative viscosity of 1.70 are admixed with: 14 parts of a halogenated epoxy resin prepared from tetrabromobisphenol A and epichlorohydrin having an average molecular weight of 2500 (the The blends were compounded, pelletized, injection molded and tested by the method as described in Example 1.

The results obtained are set out in Table 2.

TABLE 2.

| Phosphite Compound | EXAMPLE | | | CONTROL | | | |
|---|---|---|---|---|---|---|---|
| | (B) | (B) | (C) | (K) | (L) | (B) | |
| Amount of Phosphite Compound | 0.05 | 0.1 | 0.5 | 0.5 | 0.5 | 0.005 | 0 |
| Physical Properties | | | | | | | |
| Tensile Strength (kg/cm²) | 580 | 578 | 580 | 590 | 585 | 592 | 585 |
| Elongation at Break (%) | 23 | 30 | 26 | 12 | 9 | 7 | 6 |
| Notched Izod Impact Strength (V-Notch, ¼" kg . cm/cm) | 3.1 | 3.1 | 3.0 | 2.6 | 2.4 | 2.2 | 1.9 |
| Flammability | | | | | | | |
| 1/32" | V-0 | V-0 | V-0 | V-0 | V-0 | V-0 | V-0 |
| ⅛" | V-0 | V-0 | V-0 | V-0 | V-0 | V-0 | V-0 |
| Dispersion of | | | | | | | |

TABLE 2.-continued

| Phosphite | EXAMPLE | | | CONTROL | | | |
|---|---|---|---|---|---|---|---|
| Compound | (B) | (B) | (C) | (K) | (L) | (B) | |
| flame-retardant | excellent | excellent | excellent | poor | poor | poor | poor |
| Color | white | white | white | yellow | yellow | yellow | yellow |

EXAMPLE 3

In a V-blender, 70 parts of poly(ethylene terephthalate) having a relative viscosity of 1.30 are admixed with: 30 parts of glass fiber (3 mm long), 14 parts of halogenated polycarbonate prepared from tetrabromobisphenol A and phosgen, and terminated by tribromophenol (average polymerization number is 20), 6 parts of antimony trioxide, 0.2 parts of EPIKOTE 819, and 0.3 parts of phosphite compound (A). A similar test employing PBT as the polyester component was also run.

The blends were compounded at 290° C., pelletized and injection molded at 280° C. into ASTM type test bars. The test results obtained by the same method as mentioned in Example 1 are shown in Table 3.

The dispersion of the flame-retardant in the composition were tested by observing the transmitted light through the test bar.

TABLE 3.

| Polyester | EXAMPLE | | CONTROL | |
|---|---|---|---|---|
| Phosphite Compound | PBT added | PET added | PBT no | PET no |
| Physical Properties | | | | |
| Tensile Strength (Kg/cm²) | 1250 | 1300 | 1100 | 1200 |
| Elongation at Break (%) | 5.0 | 5.0 | 5.0 | 5.0 |
| Notched Izod Impact Strength (V-Notch, ⅛", Kg · cm/cm) | 5.6 | 5.1 | 4.5 | 4.4 |
| Flammability | | | | |
| 1/32" | V-O | V-O | V-O | V-O |
| ⅛" | V-O | V-O | V-O | V-O |
| Dispersion of flame-retardant | excellent | excellent | poor | poor |
| Color | white | white | yellow | yellow |

What we claim is:

1. A flame retarding thermoplastic polyester composition comprising an admixture of:
   (A) a thermoplastic polyester comprising a condensation product of an aromatic dicarboxylic acid and an alkanediol,
   (B) from 3 to 30 parts by weight per 100 parts of the thermoplastic polyester, of a polymeric flame retarding agent having, in the recurring unit, a structure represented by the formula

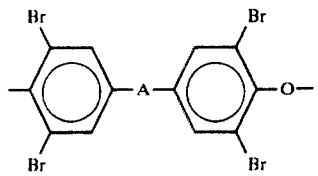

wherein A represents a member selected from the group consisting of an alkylene group having 1 to 6 carbon atoms, an ether, a carbonyl thioether and a sulfone group, said polymeric flame retarding agent having a molecular weight of from about 1000 to 5000, and
   (C) from 0.05 to 5 parts by weight per 100 parts of the polyester of at least one phosphite compound selected from the group consisting of compounds represented by the general formulas (I) and (II)

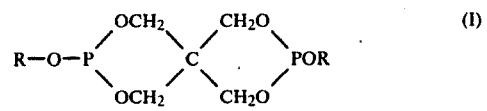

and

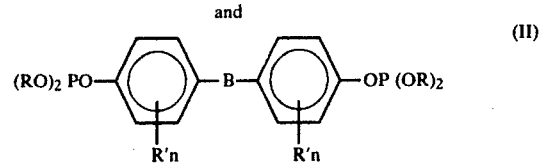

wherein R is a monovalent alkyl group having 6 to 20 carbon atoms, R' is hydrogen or a monovalent alkyl group having 1 to 6 carbon atoms, η is an integer of 2 to 4, and B represents a member selected from the group consisting of an alkylene group having 1 to 6 carbon atoms, ether, carbonyl, thioether and sulfone groups.

2. A flame retarding composition as defined in claim 1, wherein the thermoplastic polyester is poly butylene terephthalate.

3. A flame retarding composition as defined in claim 1, wherein the polymeric flame retarding agent comprises a structure represented by general formula

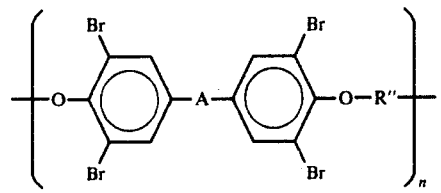

wherein A is the same as defined in claim 1 and R" represents a divalent group selected from the group consisting of

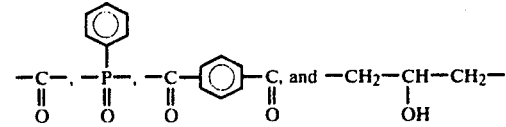

and n is an integer of 2 to 10.

4. A flame retarding composition as defined in claim 1, wherein the polymeric flame retarding agent is a halogenated polycarbonate having a recurring unit represented by

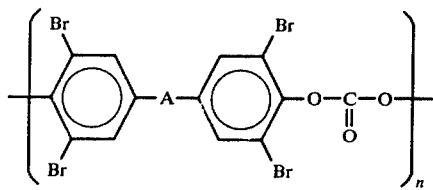
wherein n is an integer of 2 to 10, and A is same as defined in claim 1.
5. A flame retarding composition as defined in claim 1, wherein the polymeric flame retarding agent is a halogenated epoxy resin having a recurring unit represented by
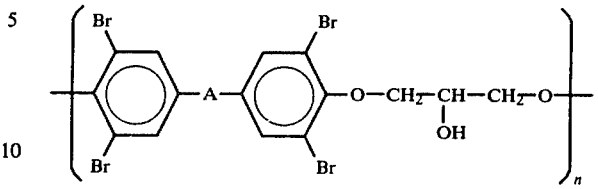
wherein n is an integer of 2 to 10 and A is same as defined in claim 1.
* * * * *